US006501304B1

(12) United States Patent
Boerstler et al.

(10) Patent No.: US 6,501,304 B1
(45) Date of Patent: Dec. 31, 2002

(54) GLITCH-LESS CLOCK SELECTOR

(75) Inventors: David W. Boerstler, Round Rock, TX (US); Gary D. Carpenter, Pflugerville, TX (US); Hung C. Ngo, Austin, TX (US); Kevin J. Nowka, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/974,990

(22) Filed: Oct. 11, 2001

(51) Int. Cl.[7] .............................................. H03K 17/00
(52) U.S. Cl. .......................... 327/99; 327/34; 327/407
(58) Field of Search ...................... 327/34, 99, 407–411

(56) References Cited

U.S. PATENT DOCUMENTS

| | | | |
|---|---|---|---|
| 4,853,653 A | 8/1989 | Maher | 331/49 |
| 4,965,524 A | 10/1990 | Patchen | 328/72 |
| 5,623,223 A | 4/1997 | Pasqualini | 327/298 |
| 5,652,536 A | 7/1997 | Nookala et al. | 327/298 |
| 6,239,626 B1 * | 5/2001 | Chesavage | 327/99 |

* cited by examiner

Primary Examiner—Kenneth B. Wells (74) Attorney, Agent, or Firm—Richard F. Frankeny; Winstead Sechrest & Minick P.C.; Casimer K. Salys (57) ABSTRACT

A glitch-free clock selector selects between asynchronous clock signals. In one embodiment a select signal has two logic states corresponding to the two clock signals. A clock output signal is gated with a latched compare signal which compares a new select signal state to a stored current select signal state. A multiplexer (MUX) selects between the two clock signals in response to a select latch output signal. If the new and current select signals do not compare the clock output signal is forced to a logic zero by the output of a compare latch which latches the compare signal when the MUX output (present selected clock signal) goes to a logic zero. While the present clock signal is held low, the MUX switches to the new clock signal. The new clock signal (MUX output) latches the new select state as the current select state causing the new and current select signal to compare. The new clock signal (MUX output) latches the compare signal and again enables the clock output signal when the new clock signal transitions from a one to a zero. The clock output signal now transitions to a logic one on the next positive transition of the new clock signal guaranteeing glitch free operation. In another embodiment more than two clock signals are selected by providing a multi-bit select signal and registers instead of single bit latches. The select signal is decoded to provide the select signal for the MUX which now selects between more than two clock signals.

23 Claims, 7 Drawing Sheets

GLITCH-LESS CLOCK SELECTOR

CROSS REFERENCE TO RELATED APPLICATION

The present invention is related to the following U.S. Patent Applications which are incorporated by reference:

Ser. No. 09/975,187 entitled "Duo-mode Charge Pump" filed concurrently herewith, and Ser. No. 09/974,969 entitled "Multi-mode VCO" filed concurrently herewith, Ser. No. 09/974,987 entitled "Clock Divider With Bypass" filed concurrently herewith, and Ser. No. 09/974,985 entitled "Dynamically Scaled Low Voltage Clock Generator System" filed concurrently herewith.

TECHNICAL FIELD

The present invention relates in general to circuits for generating and controlling computer clocks.

BACKGROUND INFORMATION

Phase-locked loops (PLL's) have been widely used in high-speed communication systems because PLL's efficiently perform clock recovery or clock generation at a relatively low cost. Dynamic voltage and frequency scaling is a critical capability in reducing power consumption of power sensitive devices. Scaling, in this sense, means the ability to select high performance with nominal power supply voltages and high frequency clock operation or low performance by reducing the power supply voltage and corresponding the clock frequency. Reducing the system power is usually done when performance is not needed or when running from a limited energy source such as a battery. To allow low power operation, the PLL and other circuits must support very aggressive power/energy management techniques. For the PLL this means low power operation while supporting key required features such as dynamic frequency scaling, dynamic voltage scaling, clock freezing and alternate low frequency clocking. Dynamic implies that the PLL is able to support changes in the output frequency and logic supply voltage without requiring the system to stop operation or waiting for the PLL clock to reacquire lock.

Using a PLL or delay-locked loop (DLL) has advantages in a battery powered system because a PLL is able to receive a lower frequency reference frequency from a stable oscillator to generate system clock frequencies. A PLL also allows changing the system clock frequency without changing the reference frequency.

In switching between two or more clocks in a PLL or other logic system it is important that the switching be glitch-free. Transients that occur on a clock in a computer system that is not one of the useable edges may be mistaken by the logic system as a valid clock edge and thus create timing problems or system failures. If the two or more clocks are synchronous, which means they are derived from the same reference source, providing glitch-free switching is simpler to achieve. However, if the two or more clocks are not synchronous, glitch-free switching is more difficult. In many logic systems, and in particular PLL clock systems used in a system that employs frequency scaling, there are times when it may be advantageous to switch between asynchronous clocks for the system clock while providing glitch-free switching.

There is, therefore, a need for a logic circuit that is able to switch between two or more clocks that may be synchronous or asynchronous.

SUMMARY OF THE INVENTION

A glitch-free clock selector operates to select between asynchronous clock signals in response to a select command. In one embodiment of the present invention, a two-input multiplexer (MUX) receives a clock A and a clock B. A select signal selects clock A when it is in one logic state and clock B when it is in the other logic state. The MUX output switches immediately to a clock signal based on the state of the select signal. The MUX output is combined in a logic AND gate with a latched compare signal that compares the present state of the select signal to a new state of the select signal and generates a logic one when they compare and a logic zero when they do not. At the time the new state of the select signal is latched, the present state of the select signal and the new state do not compare. The compare signal is latched when the output of the MUX transitions to a logic zero de-gating an AND logic gate, generating the clock output, and forcing the clock output to stay at its logic zero state. The new state of the select signal is also latched as the MUX select signal which switches the MUX output to the new clock. When the new clock transitions to a logic one, the select signal is latched generating the "present state" of the select signal. At this time the new state and the present state of the select signal compare and the compare signal goes to a logic one. The new compare is latched on the negative transition of the MUX output (when the new clock goes low). The logic AND gate is enabled by the new latched compare signal at the time the MUX output is a logic zero. When the MUX output makes its next positive transition, the clock output is guaranteed to start on the same transition providing glitch-free clock selection. Another embodiment of the present invention selects between more than two asynchronous clocks. In this embodiment selection is made by more than one select signal. The select signals are selectively latched in registers. The outputs of the registers are compared in a multi-bit digital comparator that generates a compare logic signal depending on the results of the compare. The compare signal is latched on the negative transition of the MUX output. The select signals are decoded in a decoder to generate select signals that control a MUX with more than two inputs. The output of the MUX is combined in a logic AND gate to guarantee that the clock output is de-gated low when the present clock is at a low level following a change in the select signals, and enabled when a new selected clock is also at a low state. The clock output is therefore guaranteed to be glitch-free during clock switching.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following detailed descriptions, a logic zero is a low or zero voltage and a logic one is a high or a plus supply voltage to simplify explanation of embodiments of the present invention.

Figure 1:
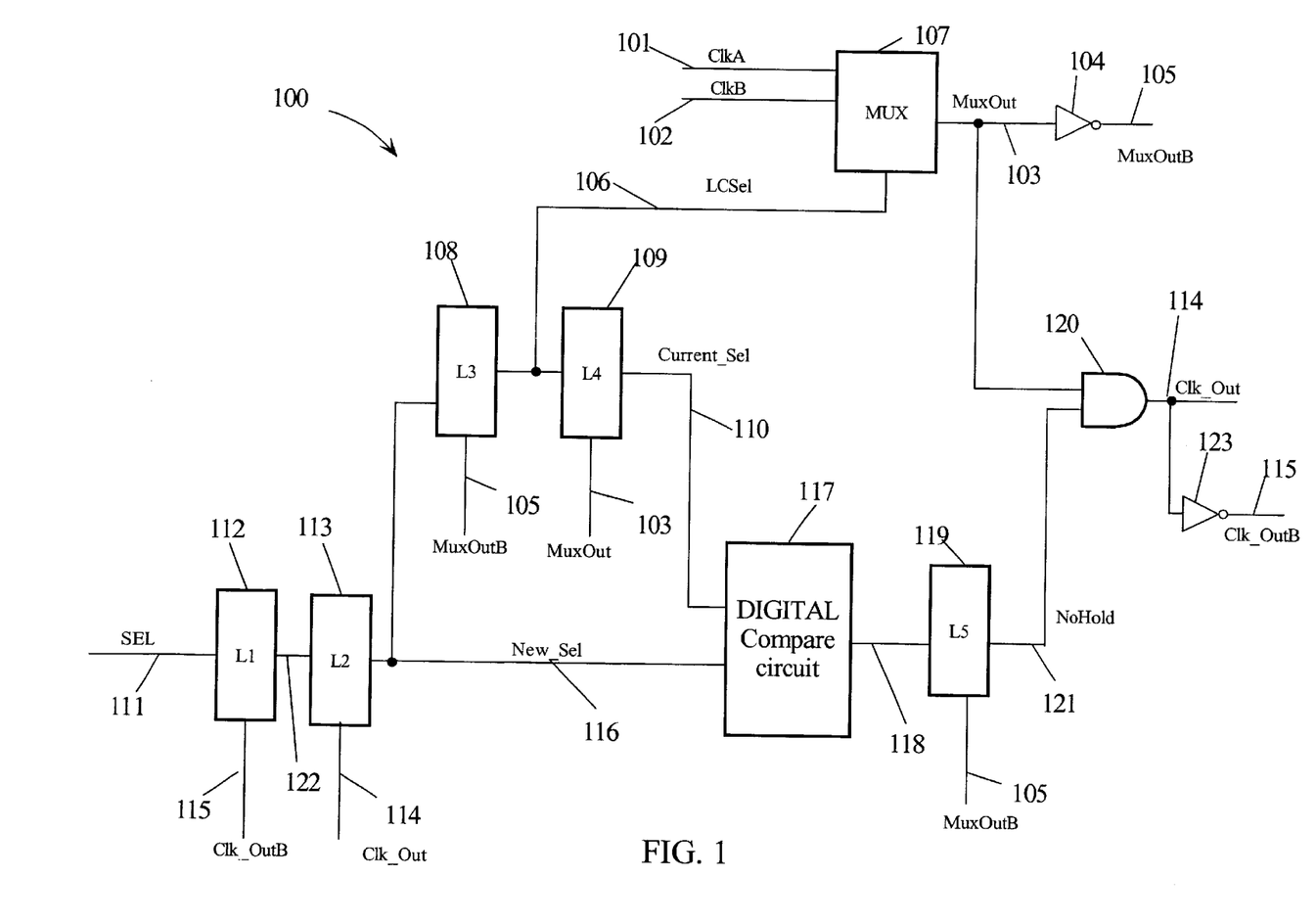
FIG. 1 is a logic circuit diagram of a glitch-free circuit for switching between two where the clocks may be synchronous or asynchronous.

FIG. 1 is a logic diagram of a glitch-free circuit 100 for switching between two clocks to generate a system clock according to embodiments of the present invention. Multiplexer (MUX) 107 is used to select between a clock A (ClkA) 101 and a clock B (ClkB) 102. ClkA 101 and ClkB 102 may be synchronous or asynchronous. MUX 107 switches between ClkA 101 and ClkB 102 in response to a latched clock select signal (LCSel) 106. In the explanation of glitch-free circuit 100, a logic zero on LCSel 106 selects ClkA 101 and a logic one selects ClkB 102 as MuxOut 103. MuxOut 103 is inverted by inverter 104 to generate MuxOutB 105. Clock select (SEL) 111 is the main input that directs circuit 100 to select a clock for Clk_Out 114. Assume SEL 111 switches from a logic zero to a logic one (from selecting ClkA 101 to ClkB 102). Latch L1 112 is a latch that stores the state of its input (SEL 111) when its latch control (Clk_OutB 115) transitions to a logic one. Since Clk_OutB 115 is the logic inversion of Clk_Out 114, SEL 111 is latched into L1 112 when Clk_Out 114 transitions to a logic zero. Likewise, Latch L2 113 latches its input when Clk_Out 114 is a logic one. In this example, if SEL 111 transitions from a logic zero to a logic one, a logic one is latched into L1 112 when Clk_Out 114 goes low and then into L2 113 when Clk_Out 114 next goes to a logic one. The present value of SEL 111 becomes New_Sel 116. New_Sel 116 is one input to digital comparator (Comp) 117. Comp 117 is a logic one if New_Sel 116 and Current_Sel 110 are the same logic state. Once a selection for a clock is made, Clk_Out 114 and MuxOut 103 are the same.

Since SEL 111 may change, New_Sel 116 and Current_Sel 110 will not compare when New_Sel 116 is updated when Clk_Out 114 transitions to a logic. This causes compare output 118 to transition to a logic zero (no compare). The logic zero of compare output 118 is latched into latch L5 119 and output (NoHold) 121 will go low when MuxOutB 105 transitions to logic one. NoHold 121 goes to a logic zero and de-gates AND 120 and forces Clk_Out 114 to stay a logic zero. Likewise, New_Sel 116 is also latched into L3 108 when MuxOutB 105 transitions to logic one. New_Sel 116 becomes Mux 107 control signal (LCSel) 106. LCSel 106 causes MUX 107 to select ClkB as MuxOut 103. At this point, logic AND gate 120 is still de-gated (by NoHold 121) and Clk_Out 114 is held at a logic zero. When the "new" MuxOut 103 goes to a logic one, latch L4 109 will latch New_Sel 116 (from LCSel 106) to become Current_Sel 110. Current_Sel 110 and New_Sel 116 will then immediately compare in Comp 117 and compare output 118 will transition to a logic one. When MuxOut 103 (ClkB 102) again goes low (MuxOutB 105 goes to a logic one) latch L5 119 will latch the compare output 118 (now at a logic one) enabling logic AND gate 120. On the next transition of MuxOut 103 to a logic one, Clk_Out 114 will transition to a logic one and start a cycle as ClkB 102. Clock selector 100 stays in this state until SEL 111 again changes state requesting ClkA 101.

It should be noted that latches may be used that latch on different transitions of the Clk_Out 114 and MuxOut 103 and still be within the scope of the present invention if they are used to generate the same state sequences. The logic polarity of the signals may also be reversed generating complementary results in the logic states of the Clk_Out 114 during switching without departing from the scope of the present invention. While exemplary circuits use the same latch type and invert signals Clk_Out 114 and MuxOut 104 to generate complementary signals MuxOutB 105 and Clk-OutB 115 respectively, it is understood that the latches that use these particular signals could be designed to latch on positive or negative transition so that the generation of the complementary signals unnecessary.

Figure 2:
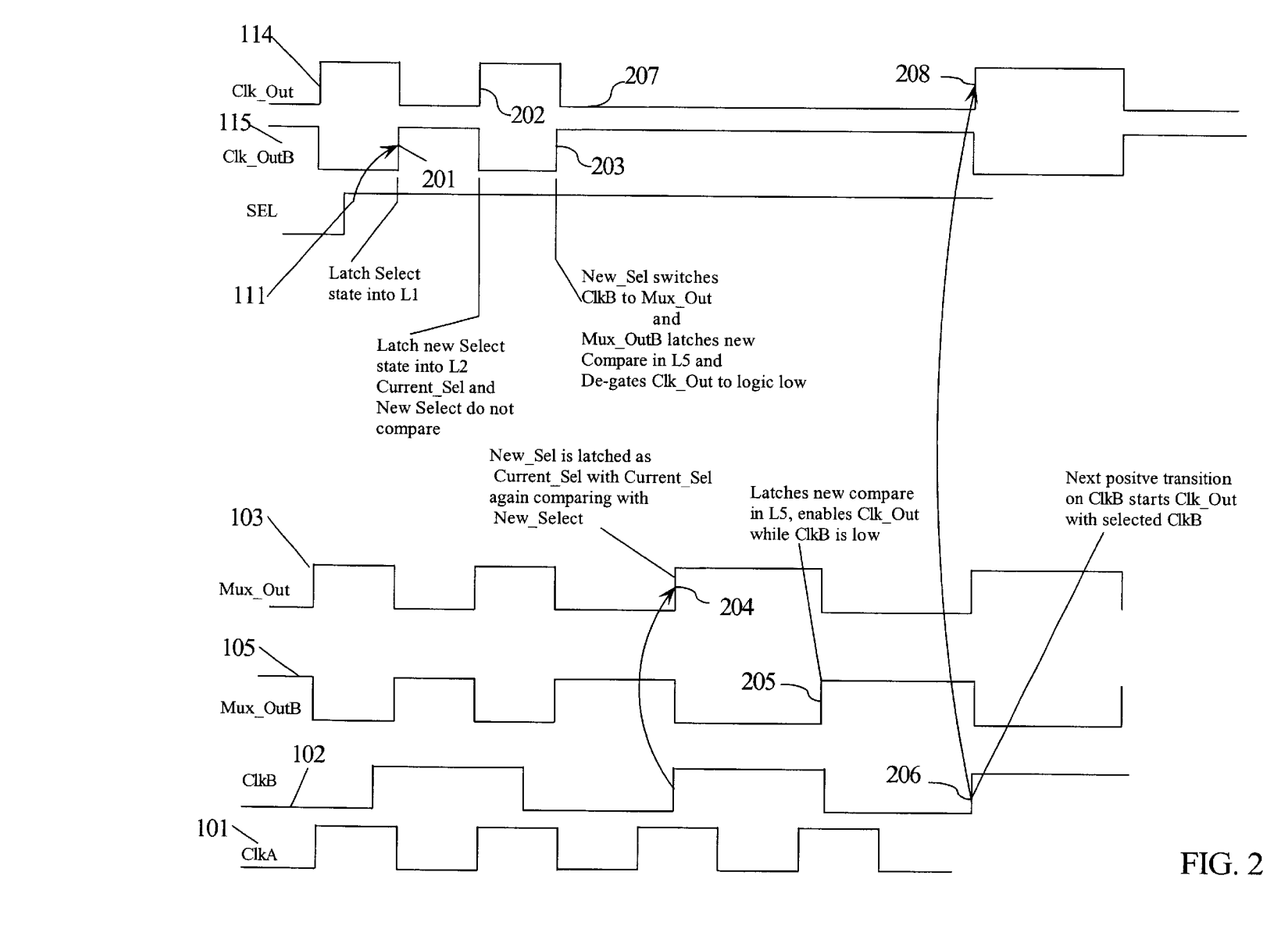
FIG. 2 is a timing diagram of signals in the circuit of FIG. 1 with explanations of various timings.

FIG. 2 is a waveform diagram of signals representative of operation of the glitch-free free clock selector of FIG. 1 according to embbodiments of the present invention. SEL 111 has a state change. The new state of SEL 111 is latched into L1 112 on the transition 201 of Clk_OutB 115. On transition 202 of Clk_Out 114, the state of SEL 111 is latched into L2 113 which becomes New_Sel 116. At this time, Current_Sel 110 and New_Sel 116 do not compare and compare output 118 goes to a logic zero. At transition 203 of Clk_OutB 115, New_Sel 116 is latched into L3 108 becoming LCSel 106 which switches ClkB 102 to MuxOut 103. At the same time, transition 203 of Clk_OutB 115 latches compare output 118 into L5 119 as output 121 which goes low and de-gates logic AND 120 so Clk_Out 114 remains a logic low. MuxOut 103 now follows ClkB 102. At transition 204 of MuxOut 103 (ClkB 102), LCSel 106 is latched in L4 109 as the "new" Current_Sel 110 and Current_Sel 110 and New_Sel 116 again compare causing compare output 118 to again transition to a logic one. MuxOut 103 was de-gated by latched compare 121 at transition 203 in logic AND 120 and Clk_Out 114 was forced to remain a logic low. At transition 205 of Mux_OutB 105, latched compare 121 is latched into L5 119 enabling logic gate 120. Transition 206 of Mux_Out 103 (ClkB 102) is the first positive transition following the enabling of logic gate 120. This transition becomes transition 208 of Clk_Out 114 which is now following ClkB 102 and was switched without glitches.

Figure 3:
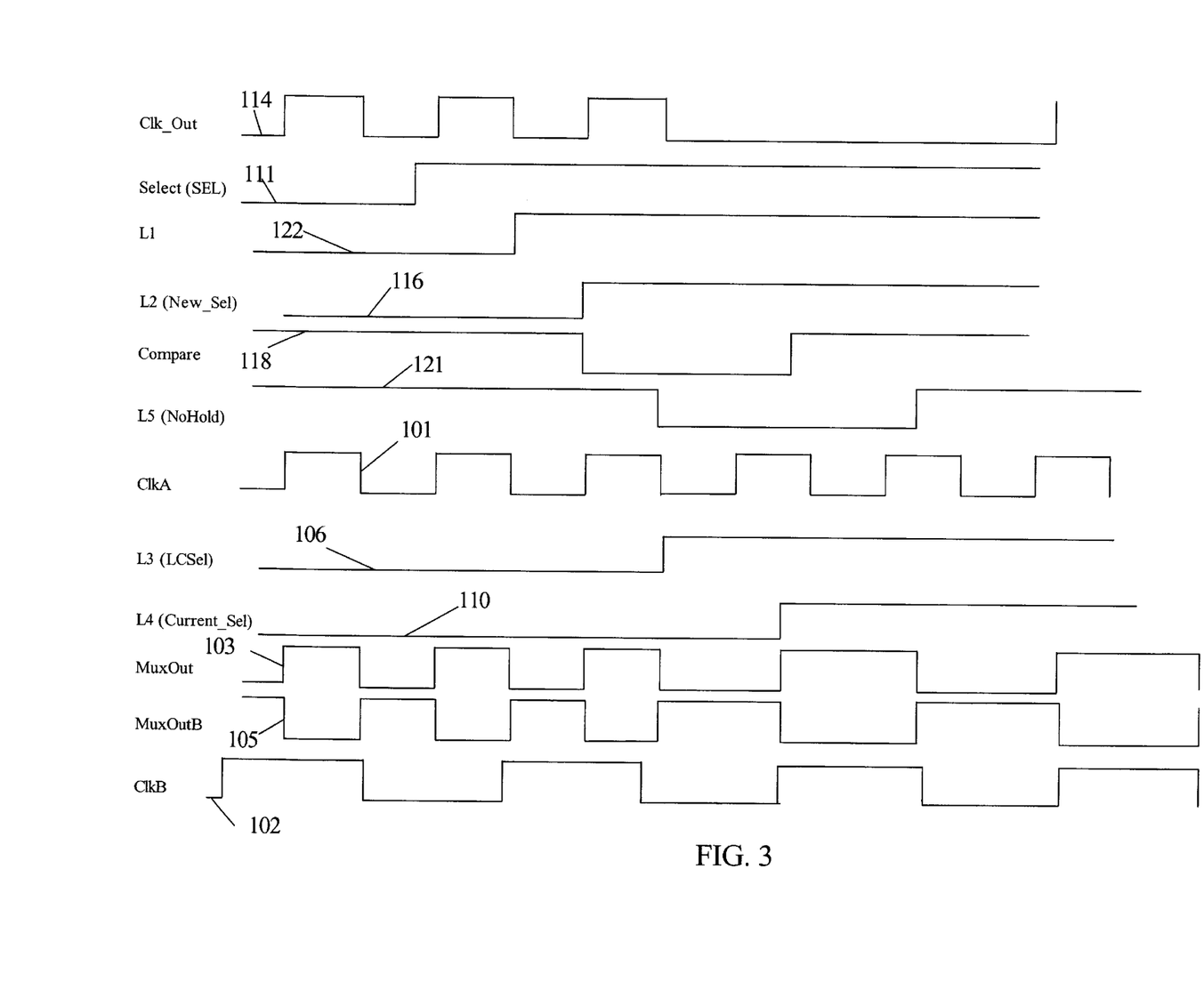
FIG. 3 is another detailed timing diagram of signals in FIG. 1.
Figure 4:
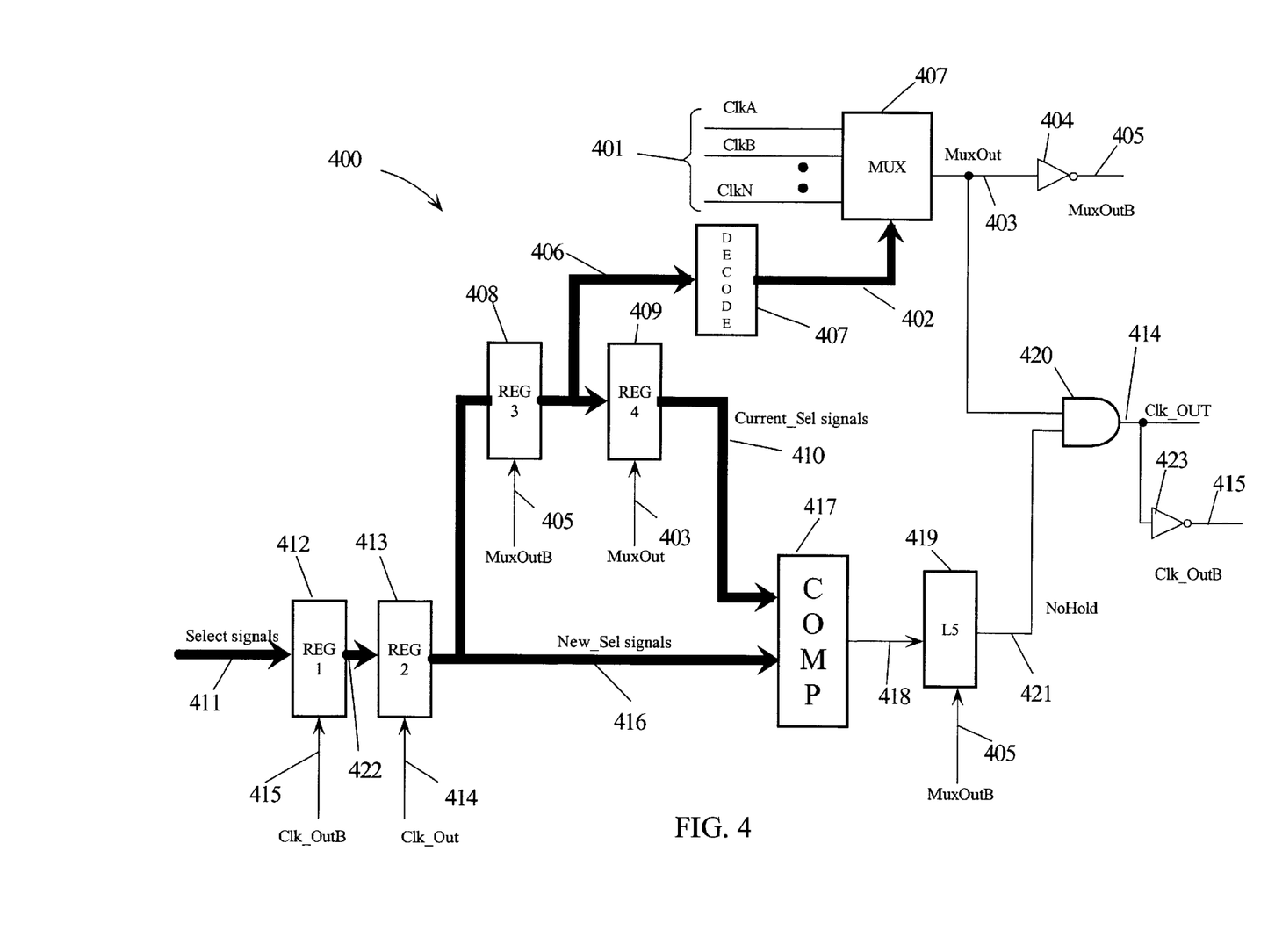
FIG. 4 is a block diagram of another embodiment of the present invention with more than two clocks.

FIG. 3 is a more detailed timing diagram of signals of FIG. 1. FIG. 4 is a block diagram of another embodiment of the present invention where Clk_Out 414 is selected from a plurality of more than two clock signals 401. To select from more than two clocks requires more than one logic signal. Select signals 411 are latched into register (Reg) 412 on the positive edge of Clk_OutB 415 and become latched outputs 422. Latched outputs 422 are latched into Reg 413 on the positive edge of Clk_Out 414 to generate New_Sel signals 416. New_Sel signals 416 and Current_Sel signals 410 are compared in multi-bit digital comparator (Comp) 417 and compare output 418 goes to a logic low. Compare output 418 is latched into L5 419 on the positive edge of MuxOutB 405 generating latched compare signal NoHold 421 as a logic low. The same transition of MuxOutB 405 latches New_Sel signals 416 into Reg 408 which become latched outputs 406 which are decoded in decoder 407 to generate decoded outputs 402. Decoded outputs 402 determine which clock signal (ClkA–ClkN) in clock signals 401 becomes MuxOut 403. Since Clk_Out 414 was following the previous MuxOut 403, when MuxOut 403 made a transition to a logic zero (MuxOutB 405 made a transition to a logic one), Clk_Out 414 is de-gated in logic gate 420 precisely when it is already at a low state guaranteeing no glitches. MuxOut 403 switches to a new clock signal but its state is de-gated by the fact that NoHold 421 is a logic low. When MuxOut 403 transitions to a logic one the latched outputs 406 are latched into Reg 409 as Current_Sel signals 410. At this time Current_Sel 410 and New_Sel 416 again compare and compare output 418 goes to a logic one. On the next positive transition of MuxOutB 405 the logic one of compare output 418 is latched into L5 419 as NoHold 421 enabling logic AND gate 420. Since MuxOutB 405 is at a logic one, MuxOut 403 is at a logic zero. This again prevents any glitches on Clk_Out 414. On the next positive transition of MuxOut 403 (newly selected clock signal), logic AND gate 420 assures that Clk_Out 414 starts on the actual transition of the new clock signal selected in MUX 407.

Figure 5:
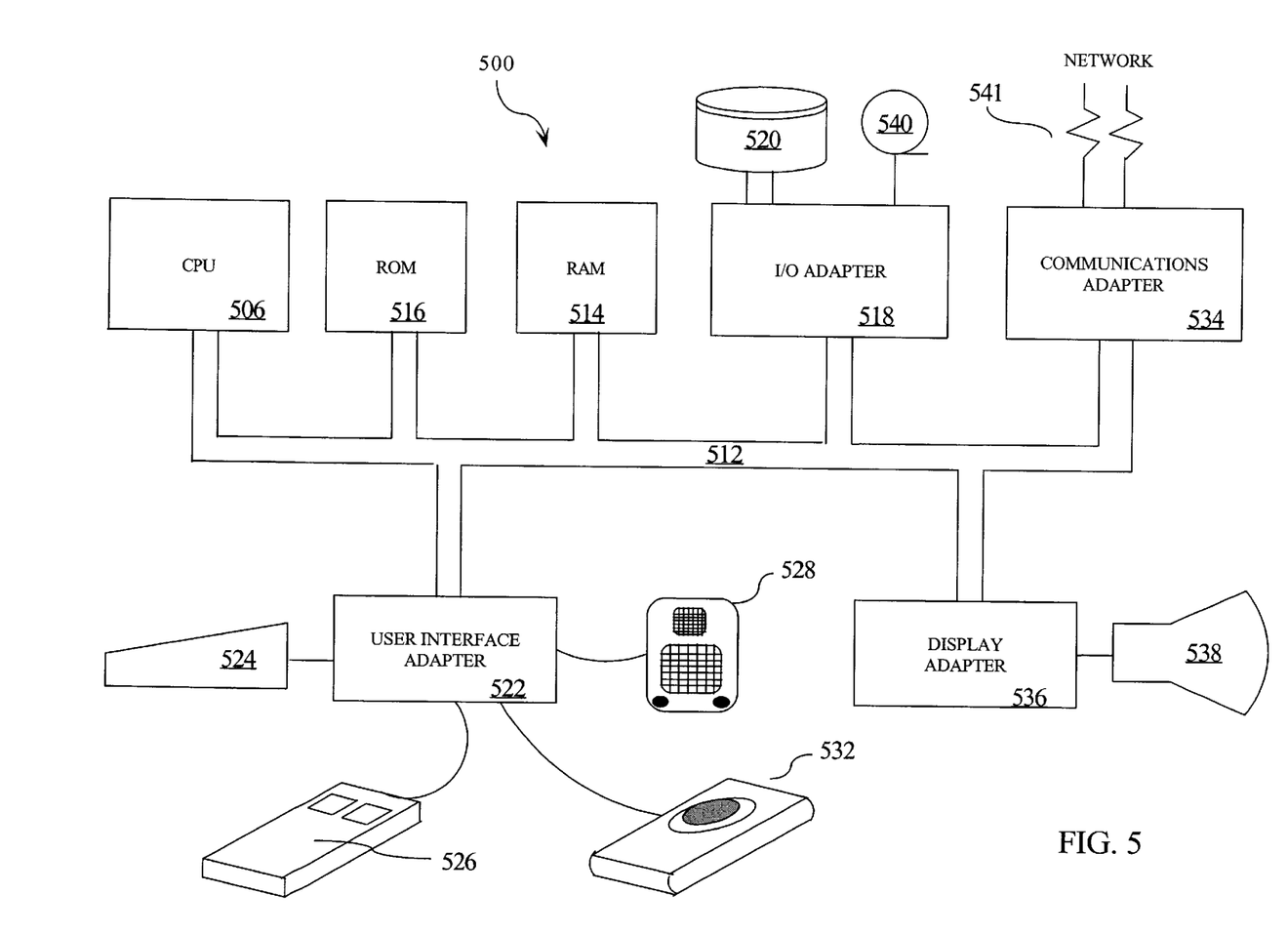
FIG. 5 is a high level functional block diagram of a representative data processing system 500 suitable for practicing the principles of the present invention.

FIG. 5 is a high level functional block diagram of a representative data processing system 500 suitable for practicing the principles of the present invention. Data processing system 500, includes a central processing system (CPU) 510 operating in conjunction with a system bus 512. System bus 512 operates in accordance with a standard bus protocol, such that as the ISA protocol, compatible with CPU 510. CPU 510 operates in conjunction with electronically erasable programmable read-only memory (EEPROM) 516 and random access memory (RAM) 514. Among other things, EEPROM 516 supports storage the Basic Input Output System (BIOS) data and recovery code. RAM 514 includes, DRAM (Dynamic Random Access Memory) system memory and SRAM (Static Random Access Memory) external cache. I/O Adapter 518 allows for an interconnection between the devices on system bus 512 and external peripherals, such as mass storage devices (e.g., a hard drive, floppy drive or CD/ROM drive), or a printer 540. A peripheral device 520 is, for example, coupled to a peripheral control interface (PCI) bus, and I/O adapter 518 therefore may be a PCI bus bridge. User interface adapter 522 couples various user input devices, such as a keyboard 524, mouse 526, touch pad 532 or speaker 528 to the processing devices on bus 512. Display 539 which may be, for example, a cathode ray tube (CRT), liquid crystal display (LCD) or similar conventional display units. Display adapter 536 may include, among other things, a conventional display controller and frame buffer memory. Data processing system 500 may be selectively coupled to a computer or telecommunications network 541 through communications adapter 534. Communications adapter 534 may include, for example, a modem for connection to a telecom network and/or hardware and software for connecting to a computer network such as a local area network (LAN) or a wide area network (WAN). CPU 510 and other components of data processing system 500 may contain a glitch-free clock selector circuit according to embodiments of the present invention.

Figure 6:
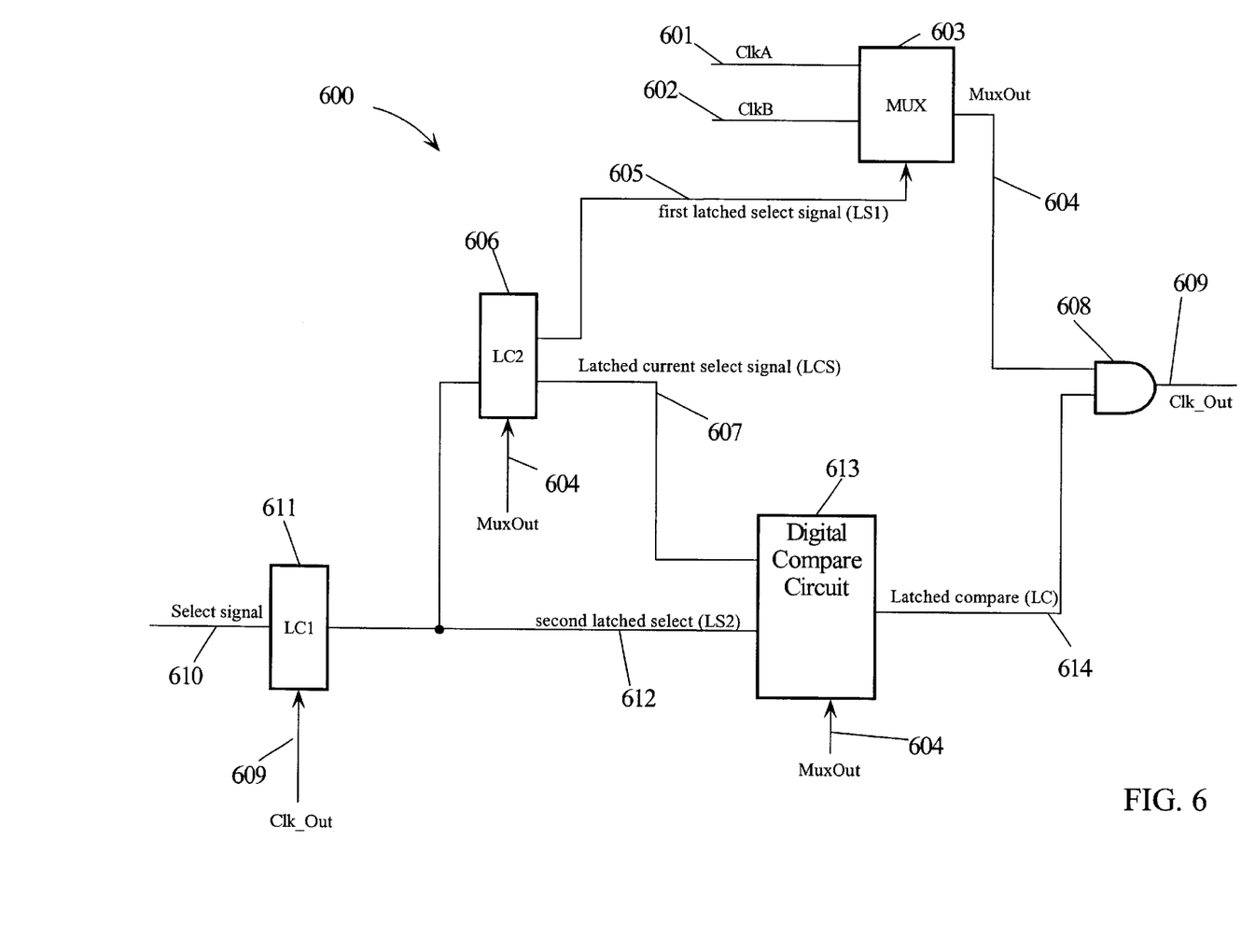
FIG. 6 is a block diagram of another embodiment of the present invention.

FIG. 6 is a block diagram of a more general embodiment of the present invention. MUX 603 receives ClkA 601 and ClkB 602 and selects one to the clock signals as MuxOut 604 depending on the state of first latched select signal(LS1) 605. MuxOut 604 is combined in a logic AND gate 608 with latched compare signal (LC) 614 generating Clk_Out 609. Select signal 610 is selectively latched in latch circuit LC1 611 on edges of Clk_Out 609 to generate second latched select signal (LS2) 612. Digital compare circuit 613 compares LS2 612 with latched current select (LCS) signal 607 and generates latched compare signal (LC) 614 on a transition of MuxOut 604. LC 614 is a logic zero when LS2 612 and LCS 607 do not compare and a logic one when LS2 612 and LCS 607 do compare. LS2 612 is latched on edges of MuxOut 604 to generate LCS 607 and LS1 605. ClkA 601 and ClkB 602 are selected as MuxOut 604 depending on the state of LS1 605. By de-gating logic AND gate 608 when a selected clock signal is at a logic low state forces Clk_Out 609 to stay at a logic low and enabling AND gate 608 when a new clock signal selected as MuxOut 604 transitions to a logic low guarantees that Clk_Out 609 always starts on a positive transition of the new clock signal and has no glitches.

Figure 7:
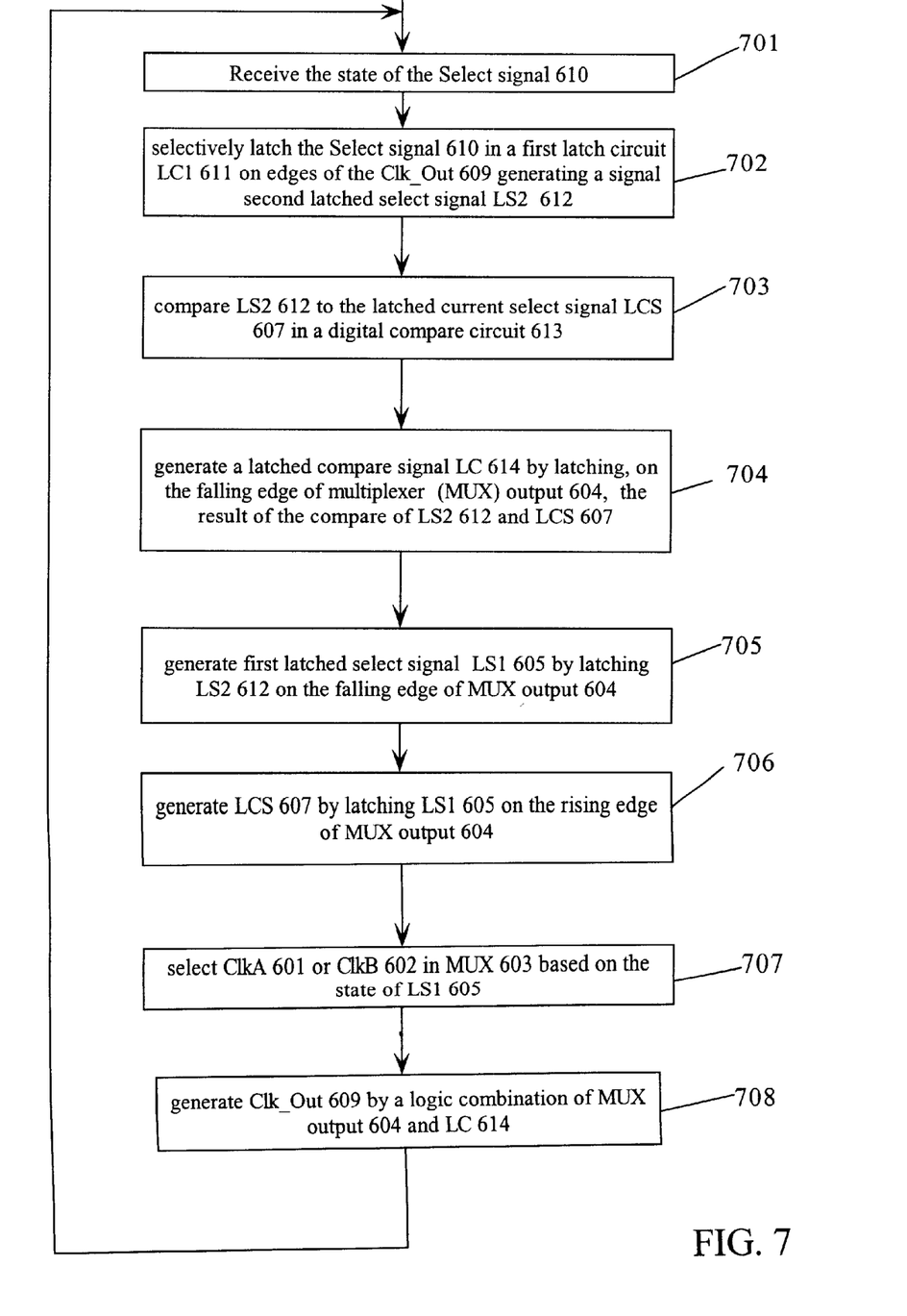
FIG. 7 is a flow chart of method steps in one embodiment of the present invention.

FIG. 7 is a flow diagram of method steps in embodiments of the present invention. In step 701, the state of select signal 610 has a state change. In step 702, select signal 610 is selectively latched in latch circuit LC1 611 on edges of Clk_Out 609 generating LS2 612. In step 703, LS2 612 is compared to LCS 607 in digital compare circuit 613. In step 704, LC 614 is generated by latching the result of the compare of LS2 612 and LCS 607 on the falling edge of MuxOut 604. In step 705, LS1 605 is generated by latching LS2 612 on the falling edge of MuxOut 604. In step 706, LCS 607 is generated by latching LS2 612 on the rising edge of MuxOut 604. In step 707, ClkA 601 and ClkB 602 are selected as MuxOut 604 based on the state of LS1 605. In step 708, Clk_Out 609 is generated a logic combination of MuxOut 604 and LC 614 in logic AND gate 608. A return is taken to step 601 where Select signal 610 is again received.

The present invention and its advantages have been described in detail, it should be understood that various changes, substitutions and alterations can be made herein without departing from the spirit and scope of the invention as defined by the appended claims.

What is claimed is:

1. A clock signal selector circuit for selecting a clock signal output from two clock signals comprising:
   a multiplexer receiving a first clock signal and a second clock signal and generating a multiplexer output in response to logic states of a first latched select signal;
   a logic circuit receiving said multiplexer output and a latched compare signal and generating said clock output signal;
   a logic compare circuit receiving a second latched select signal, a latched current select signal, and said multiplexer output and generating said latched compare signal;
   a first latch circuit receiving a select signal and generating said second latched select signal in response to said clock output signal; and
   a second latch circuit receiving said second latched select signal and generating said first latched select signal and said latched current select signal in response to said multiplexer output.

2. The clock signal selector circuit of claim 1, wherein said logic compare circuit comprises:
   a digital compare circuit receiving said second latched select and said latched current select signal and generating a compare signal; and
   a fifth latch receiving said compare signal and generating said latched compare signal in response to said multiplexer output.

3. The clock signal selector circuit of claim 2, wherein said fifth latch latches said compare signal in response to a transition of said multiplexer out from a logic one to a logic zero.

4. The clock signal selector circuit of claim 1, wherein said logic circuit comprises a AND logic gate.

5. The clock signal selector circuit of claim 1, wherein said first latch circuit comprises:
   a first latch receiving said second select signal and generating a first latched output in response to a transition of said clock signal output from a logic one to a logic zero; and
   a second latch receiving said first latched output and generating said second latched select signal in response to a transition of said clock output signal from a logic zero to a logic one.

6. The clock signal selector circuit of claim 1, wherein said second latch circuit comprises:
   a third latch receiving said second latched select signal and generating said first latched select signal in response to a transition of said multiplexer output from a logic one to a logic zero output transitions to a logic zero; and
   a fourth latch receiving said first latched select signal and generating said latched current select signal in response to a transition of said multiplexer output from a logic zero to a logic one.

7. The clock signal selector circuit of claim 1, wherein said first and second clock signals are asynchronous.

8. A clock signal selector circuit for selecting a clock output signal from a plurality of clock signals comprising:
   a multiplexer receiving said plurality of clock signals and generating a multiplexer output in response to decoded select signals;
   a logic circuit receiving said multiplexer output and a latched compare signal and generating said clock output signal;
   a logic compare circuit receiving a second latched select signals, a latched current select signals, and said multiplexer output and generating said latched compare signal;
   a first register circuit receiving select signals and generating said second latched select signals in response to said clock output signal;
   a second register circuit receiving said second latched select signals and generating first latched select signals and said latched current select signals in response to said multiplexer output; and
   a decoder receiving said first latched select signals and generating said decoded select signals.

9. The clock signal selector circuit of claim 8, wherein said logic compare circuit comprises:
   a digital compare circuit receiving said second latched select signals and said latched current select signals and generating a compare signal; and
   a fifth latch receiving said compare signal and generating said latched compare signal in response to said multiplexer output.

10. The clock signal selector circuit of claim 9, wherein said fifth latch latches said compare signal in response to a transition of said multiplexer out from a logic one to a logic zero.

11. The clock signal selector circuit of claim 8, wherein said logic circuit comprises a AND logic gate.

12. The clock signal selector circuit of claim 8, wherein said first latch circuit comprises:
   a first register receiving said second select signals and generating first latched outputs in response to a transition of said clock output signal from a logic one to a logic zero; and
   a second register receiving said first latched outputs and generating said second latched select signals in response to a transition of said clock output signal from a logic zero to a logic one.

13. The clock signal selector circuit of claim 8, wherein said second latch circuit comprises:
   a third register receiving said second latched select signals and generating said first latched select signals in response to a transition of said multiplexer output from a logic one to a logic zero output transitions to a logic zero; and
   a fourth register receiving said first latched select signals and generating said latched current select signals in response to a transition of said multiplexer output from a logic zero to a logic one.

14. The clock signal selector circuit of claim 9, wherein said plurality of clock signals are asynchronous.

15. A data processing system comprising:
   a central processing unit (CPU), operable a different clock frequencies, having a multiplexer receiving said plurality of clock signals and generating a multiplexer output in response to decoded select signals, a logic circuit receiving said multiplexer output and a latched compare signal and generating said clock signal output and a logic compare circuit receiving second latched new select signals, a latched current select signals, and said multiplexer output and generating said latched compare signal, a first register circuit receiving select signals and generating said second latched select signals in response to said clock signal output, a second register circuit receiving said second latched select signals and generating first latched select signals and said latched current select signals in response to said multiplexer output, and a decoder receiving said first latched select signals and generating said decoded select signals;
   a random access memory (RAM);
   a read only memory (ROM);
   a communications adapter coupled to a communication network;
   an I/O adapter; and
   a bus system coupling said CPU to said ROM, said communications adapter, said I/O adapter, and said RAM.

16. The data processing system of claim 15, wherein said logic compare circuit comprises:
   a digital compare circuit receiving said second latched select signals and said latched current select signals and generating a compare signal; and
   a fifth latch receiving said compare signal and generating said latched compare signal in response to said multiplexer output.

17. The data processing system of claim 16, wherein said fifth latch latches said compare signal in response to a transition of said multiplexer out from a logic one to a logic zero.

18. The data processing system of claim 15, wherein said logic circuit comprises a AND logic gate.

19. The clock signal selector circuit of claim 15, wherein said first latch circuit comprises:
   a first register receiving said second select signals and generating first latched outputs in response to a transition of said clock output signal from a logic one to a logic zero; and
   a second register receiving said first latched outputs and generating said second latched select signals in response to a transition of said clock output signal from a logic zero to a logic one.

20. The data processing system of claim 15, wherein said second latch circuit comprises:
   a third register receiving said second latched select signals and generating said first latched select signals in response to a transition of said multiplexer output from a logic one to a logic zero output transitions to a logic zero; and
   a fourth register receiving said first latched select signals and generating said latched current select signals in response to a transition of said multiplexer output from a logic zero to a logic one.

21. The data processing system of claim 16, wherein said plurality of clock signals are asynchronous.

22. A clock signal selector circuit comprising:
   circuitry for selecting a first clock signal as a clock output signal in response to a first logic state of a select signal and a second clock signal as said clock output signal in response to a second logic state of said select signal, wherein in a transition of said clock output signal from said first clock signal to said second clock signal said clock output signal first stops as said first clock signal in a logic zero corresponding to a concurrent logic zero of said first clock signal and said second clock signal following a transition of said select signal from a logic zero to a logic one, and said clock output starts as said second clock signal with a first transition of said second clock signal from a logic zero to a logic one following said concurrent logic zero state of said first clock signal and said second clock signal.

23. A clock signal selector circuit comprising:
   a multiplexer receiving a first clock signal and a second clock signal and generating a multiplexer output signal in response to a first select signal;
   a logic circuit receiving said multiplexer output and an enable signal and generating a clock output signal; and
   a sequential logic circuit receiving a second select signal and generating said enable signal and said first select signal in response to transition states of said multiplexer output and said clock output signal, wherein said clock output signal is disabled by said enable signal at a stop condition corresponding to a concurrent first logic state of said first clock signal and said second clock signal following a logic transition of said second select signal and enabled preceding a transition to a second logic state of a selected one of said first clock signal and said second clocs signal following said Stop condition.

* * * * *